United States Patent

[11] 3,583,359

| [72] | Inventors | Gengo Nakagawa<br>Kawasaki-shi;<br>Tsuneo Hiroyama, Sagamihara-shi, both of, Japan |
|---|---|---|
| [21] | Appl. No. | 875,173 |
| [22] | Filed | Nov. 10, 1969 |
| [45] | Patented | June 8, 1971 |
| [73] | Assignee | Hirama Rika Kenkyiyo, Ltd.<br>Kawasaki-shi, Japan |

[54] CLICK DEVICE FOR SETTING A DIAL
3 Claims, 5 Drawing Figs.
[52] U.S. Cl. .................................................... 116/124,
74/10.41, 116/124.1, 116/129
[51] Int. Cl. ....................................................... G09f 9/00
[50] Field of Search ............................................ 116/115,
115.5, 124, 129, 129.4, 133; 74/10.41;
192/107(Inquired); 334/86, 88

[56] References Cited
UNITED STATES PATENTS

| 1,281,338 | 10/1918 | Gargan ........................ | 116/129 UX |
| 3,109,411 | 11/1963 | Fuhrman ..................... | 116/124 |
| 3,109,412 | 11/1963 | Fuhrman et al. ............. | 116/124 |
| 3,154,051 | 10/1964 | Durst et al. .................. | 116/124 |

*Primary Examiner*—Louis J. Capozi
*Attorney*—Karl W. Flocks

ABSTRACT: A click device for setting a dial adapted to vary the click position as desired in accordance with a value in graduations at which the dial is desired to be set. The click deice comprises a groove formed on one surface of a disc mounted on a rotatable shaft for rotation relative thereto, and a rigid ball mounted on a bar fixed to said rotatable shaft adjacent said disc so that said ball may engage said one surface of said disc for movement therealong in rolling motion. The dial can be set by this click device when the rigid ball is clicked into position in said groove.

PATENTED JUN 8 1971

CLICK DEVICE FOR SETTING A DIAL

This invention relates to a click device adapted for setting a dial at one or a plurality of specified values on the graduated dial of various kinds of measuring instruments, wireless communication equipment and the like.

In using the instruments and equipment referred to above, it is often required repeatedly to set a dial at one or more specified values on the dial graduated in the wavelengths of electromagnetic waves used for measurement such as, for example, the frequencies of radio waves received by a radio receiving set or the wavelengths of electromagnetic radiations resolved by means of a spectrophotometer. In the case of a spectrophotometer, for example, it is required repeatedly to use one of more specified wavelengths as desired which are suitable for a material to be analyzed. In such an instance, it is troublesome and time consuming to set a dial each time it is required to do so by going through the same process of indexing the desired wavelength in the graduations with a pointer of the device while looking at the dial.

Accordingly, it is an object of this invention to provide a click device which permits, after a dial is once set at predetermined one or more values on the graduated dial, repeatedly to bring one of the set values as desired into registration with the pointer in a simple and positive operation without requiring to go through the troublesome operation of registering the pointer with the required value on the graduated dial by looking at the graduated dial.

Another object of the invention is to provide a click device of the type described which permits, when it is required to set a dial at a value on the graduated dial which differs from the value or values already set at, readily to alter the click position to a new position corresponding to the new value set at in a simple and positive operation.

Another object of the invention is to provide a click device of the type described in setting forth the second object which permits, after the dial is set at two values on the graduated dial, freely to alter the larger value into a smaller value which is smaller than the smaller of the two values previously set at.

Additional objects as well as features and advantages of the invention will become evident from consideration of the description set forth hereinafter when considered in conjunction with the accompanying drawings, in which.

Figure 1:
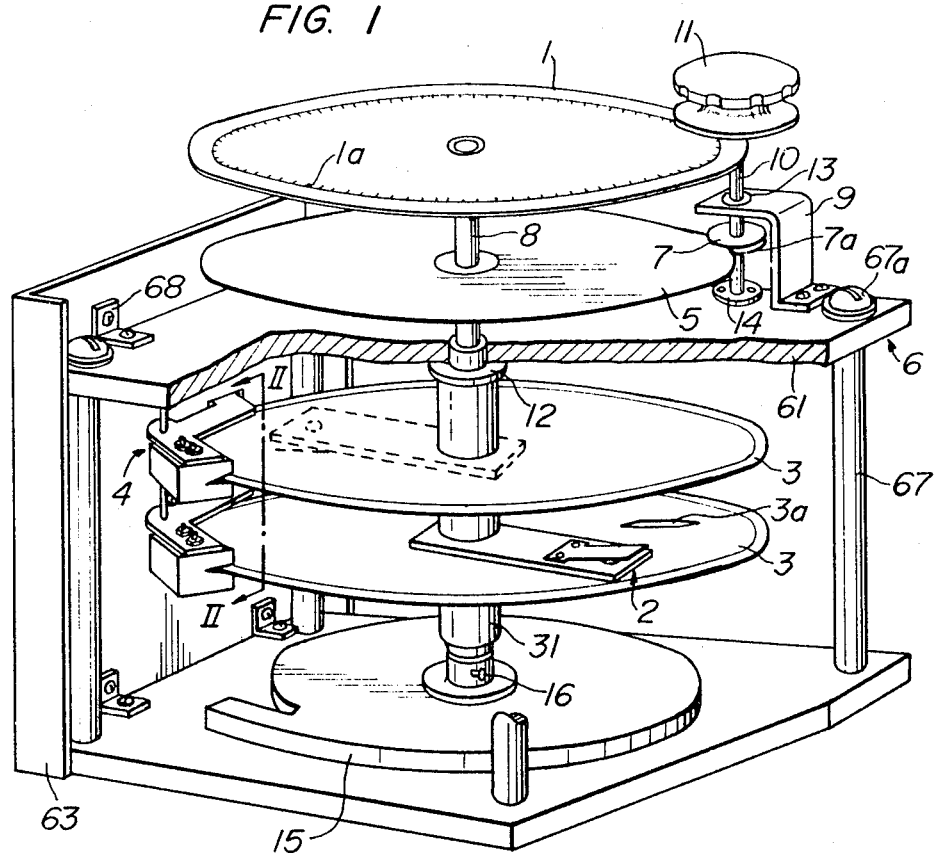
FIG. 1 is a schematic perspective view, with certain parts being shown in section, of one embodiment of the click device according to this invention.

FIG. 1 illustrates an embodiment of the click device according to this invention which is provided with two sets of click mechanism each comprising click ball keep means 2, a click disc 3 and lock means 4 adapted to engage and lock said disc in position. Said sets of lock mechanism are disposed in a housing 6 comprising a top plate 61, a bottom plate 62 and side plates 63. The discs 3 are disposed independently of each other and mounted one above the other on a shaft 8 journaled by bearings 12 attached to the upper and lower plates 61 and 62 respectively, said discs 3 being rotatable relative to said shaft 8. The click ball keep means 2 are secured to the shaft 8 in positions adjacent the respective discs 3. The side plates 63 are fixed by mounting means 68 to the top and bottom plates 61 and 62 which are fixed to each other by a plurality of cylindrical spacers 67 and fastening means 67a extending therethrough.

Figure 2:
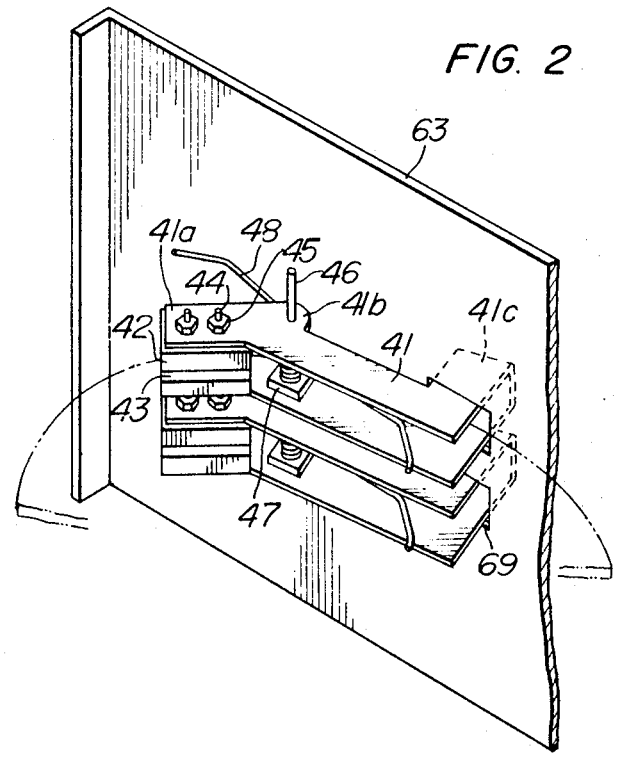
FIG. 2 is a sectional view taken along the line II—II of FIG. 1.
Figure 3:
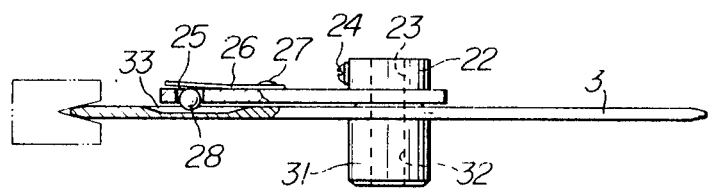
FIG. 3 is a side view of a combination of a click disc and click ball keep means which are essential components of the click device of FIG. 1.
Figure 4:
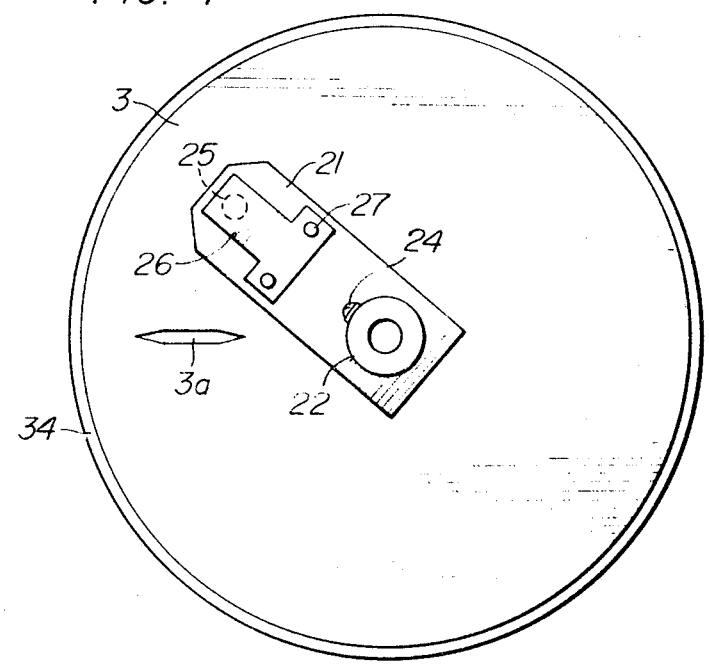
FIG. 4 is a plan view of the combination of FIG. 3.

Mounted on top of the shaft 8 is a dial 1 on which graduations 1a are marked. A knob 11 for setting the dial is secured to a shaft 10 rotatably journaled by a bearing 13 mounted on a bracket 9 secured to the top plate 61 and a bearing 14 mounted on the top plate 61. 7 is a small friction disc secured to said shaft 10 for transmitting the rotation of said knob 11 to the shaft 8. Secured to the shaft 8 is a friction disc 5 having an outer periphery which is triangular in section and which is adapted to frictionally engage a groove 7a on the outer periphery of said small friction disc 7. When the knob 11 is turned, its rotation is transmitted by said friction disc 5 to the shaft 8 through the small friction disc 7. There is provided a cam 15 which is secured to the shaft 8 by means of a setscrew 16 for transmitting a displacement to means mounted subsequently to the click device as the knob 11 is turned. In FIGS. 2 and 3, each click disc 3 is provided with a hub 31 which is formed with an axial bore 32 for loosely receiving the shaft 8 therein. The click ball keep means 2 includes a hub 22 formed with an axial bore for receiving therein the shaft 8 to which the hub 22 is secured by means of a setscrew 24. The click ball keep means 2 also includes a plate member 21 which is disposed adjacent the associated clock disc 3. A plate spring 26 is secured to the plate member 21 by means of rivets 27 for urging a rigid clock ball 28 loosely received in an opening 25 formed in the forward end portion of the plate member to press against the click disc 3. When the click ball keep means 2 is rotated relative to the click disc 3, the ball 28 moves in rolling motion on the surface of the click disc 3 till the ball 28 reaches a position on the surface of the click disc in which a groove 3a is formed. Then, the ball 28 is caused by the biasing force of the spring 26 to enter the groove 3a where it is engaged by the opposite edges of the groove 3a. The embodiment shown and described is provided with two sets of click mechanism. However, it is to be understood that the invention is not limited to this number of sets of click mechanism and that as many number of sets as possible can be provided.

As aforementioned and shown in FIG. 2, the outer periphery of the click disc 3 is triangular in section. The marginal portion of the click disc 3 is received in an engaging groove 44 formed in an engaging member 42 of the click lock means 4 so that the click disc 3 may be locked in place. A lever 41 is formed by bending a bar for holding at one end 41a between the opposing two portions of the lever 41 said engaging member which is secured to said lever by means of two sets of a bolt-and-nut combination. Said lever 41 is mounted for pivotal motion at a portion 41b thereof on a rod 46 which is secured to a bracket 47 extending inwardly from one of the sidewalls 63 of the housing so that the lever 41 is disposed within the housing. Mounted on said rod 46 is a coil spring 48 which engages one of the sidewalls 63 at one end and connected to said lever 41 at the other end. The coil spring 48 urges the lever 41 to move in the counterclockwise direction as seen in FIG. 2 so that the other end of the lever or a pushbutton 31c normally extends outwardly of the housing through an opening 69 formed in one of the sidewalls 63. The engaging member 42 of the lock means 4 is normally urged by the coil spring 48 to press against the outer periphery 34 of the associated click disc 3 so as to positively lock the click disc 3 in place.

The groove 3a formed in each click disc 3 is shaped such that its longitudinal axis is aligned with the radial direction of the click disc. The groove 3a has a width which is preferably about three-fifths or so the diameter of the ball 28 as measured circumferentially of the click disc so that the width of the groove 3a is sufficiently small to permit the ball to be held at its diametrical peripheral portion by the outer edge of the inner walls of the opening 25 formed in the plate member 21 of the click ball keep means 2 when the ball is engaged in the groove. Accordingly, if the knob 11 is turned while the click disc 3 is locked by the lock means 4, then the shaft 8 is rotated through rotation transmitting discs 7 and 5 to cause the click ball keep means 2 secured to said shaft 8 to rotate relative to the click disc 3, with the ball 28 being able to move in rolling motion on the surface of the click disc 3. Thus, the ball 28 clicks each time it moves over the radial edges of the groove 3a so that the operator can feel the click each time the ball 28 moves past the position of the groove 3a on the click disc 3 while the click ball keep means 2 is rotated. It is possible to position the click mechanism with respect to the position of the groove 3a by causing the ball 28 retained by the ball keep means 2 to be engaged in the groove 3a on the click disc 3. Accordingly, if the groove 3a on the click disc 3 is disposed in a position corresponding to a predetermined value in the graduations 1a on the dial 1, then it is possible readily to cause the click ball keep means 2 to be disposed in said position and hence to cause the shaft 8 to move to a predetermined rotational position, thereby permitting readily and positively to effect position control of subsequent devices operatively connected to the shaft 8.

The operation of the click device according to this invention will now be explained with reference to the spectrophotoelectric meter shown in FIG. 5 in which the click device according to this invention will now be explained.

Figure 5:
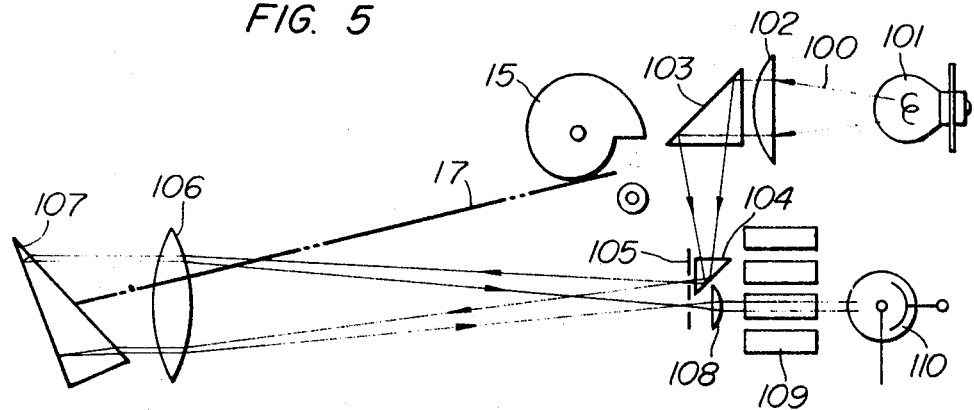
FIG. 5 is a schematic view of a spectrophotoelectric meter shown as an example of equipment in which the click device according to this invention is incorporated.

In FIG. 5, 101 refers to a lamp serving as a light source, 102 to a condensing lens, 103 and 104 to rectangular prisms, 105 to a slit, 107 to a 30° reflector prism, 106 to an achromatic lens, 108 to a lens, 109 to specimen cells, and 110 to a photoelectric tube. A light beam 100 from the light source 101 moves along a path of light indicated by the arrows to be dissolved by the 30° reflector prism 107, so that monochromatic light of a predetermined wavelength passes through one of the specimen cells 109 to be incident upon the photoelectric tube 110. The analysis of the specimen in the cells 109 is made by determining its extinction coefficient. The 30° reflector prism 107 is operatively connected through a lever 17 shown in a dot and dash line to the cam 15 secured to the shaft 8 of the click device.

The operation of setting the dial at two wavelengths of, for example 530 and 610 millimicrons in the spectrophotoelectric meter described hereinabove will now be explained. If the dial 1 graduated in wavelengths 1a is turned, the operator will feel light clicks in two positions before the dial makes one complete revolution. These click positions can be indexed with any positions as desired by the following procedure:

When the operator feels a click in a certain position on the dial while the know 11 is turned, turning of the know 11 is stopped in said click position. One of the two pushbuttons 41c is depressed and then the knob 11 is turned again. If no click is felt in said position on the dial, it indicates that the click disc and click ball keep means associated with the particular pushbutton depressed are clicked into position. If a click is felt when the knob is turned while one of the pushbuttons is depressed in the aforementioned operation, it indicated that the click disc and click ball keep means which is not associated with said one pushbutton are clicked into position. If this is the case, the dial is set at a click position again and then the other pushbutton is depressed. In this way, the dial 1 can be set at a specified wavelength or 530 millimicrons while one of the two pushbuttons is depressed. If the pushbutton 31c is released, then the groove 3a or click position on the click disc 3 is set at a position corresponding to the wavelength of 530 millimicrons on the dial. Then, the dial may be set at another wavelength or 610 millimicrons in the same manner. If the knob 11 is turned while the two pushbuttons 31c are released, a click will be felt in a position different from the position at which the dial is set previously. The dial is set at this click position and then the knob is turned while the other pushbutton is depressed so as to set the dial at the wavelength of 610 millimicrons. If the other pushbutton is released, the other click disc is positively clicked in the predetermined click position.

After the dial is set at the two wavelengths, it is possible repeatedly to turn the dial so that the wavelengths set at previously is indexed with the pointer in a simple and positive operation of turning the dial to positions in which a click can be felt without even looking at the dial.

If the two sets of click mechanism are once set so that they are clicked into positions of desired wavelengths on the dial, it is possible to eliminate the trouble of setting the dial by indexing a desired wavelength with the pointer by looking at the dial whenever the changeover of wavelengths is effected as has hitherto been the case. Instead, it is possible readily and quickly to set the dial at any wavelength as desired by means of the click mechanism. When he shaft 8 is rotated into a click position corresponding to a desired wavelength, the lever 17 abutted at one end by the cam 15 is moved in pivotal motion so as to move the 30° reflector prims in pivotal motion, thereby causing the light of the desired wavelength to be incident on the specimen cells 109.

To sum up, the present invention is effective to set a dial at a desired value on the dial graduated in varying quantities. The invention has particular utility in applications where it is required repeatedly to set the dial at more than two specified values.

What we claim is:

1. A click device for setting a dial which is adapted to vary click positions comprising at least one disc mounted on a rotatable shaft for rotation relative to said shaft, a member disposed adjacent one surface of said disc and fixed to said rotatable shaft, a spring-loaded click member mounted on said member and adapted to engage said one side of said disc, click producing means disposed on said one surface of said disc and adapted to produce a click when aligned with said click member, lock means releasably locking said disc in a predetermined position, rotation mechanism for rotating said rotatable shaft, and a graduated dial operatively connected to said rotatable shaft through said rotation mechanism.

2. A click device as defined in claim 1 wherein said member fixed to said rotatable shaft is a bar formed with an opening, said click member is a rigid ball received in said opening and adapted to be urged by spring means mounted on said bar into pressing engagement with said one surface of said disc, and said click producing means on said disc is a groove formed on said one surface of said disc and adapted to cause said ball to click into position when indexed therewith.

3. A click device as defined in claim 1 wherein said lock means comprises an engaging member formed with a groove adapted to receive the marginal portion of said disc in mating relation and pivotally mounted on a stationary member for freely engaging said marginal portion of said disc and being released from engagement therewith, and spring means for urging said engaging member into pressing engagement with said marginal portion of said disc.

UNITED STATES PATENT OFFICE
CERTIFICATE OF CORRECTION

Patent No. 3,583,359          Dated June 8, 1971

Inventor(s) Gengo NAKAGAWA and Tsuneo HIROYAMA

It is certified that error appears in the above-identified patent and that said Letters Patent are hereby corrected as shown below:

In column 1, line 8, the name of the Assignee should read as follows:

Hirama Rika Kenkyujo, Ltd.

Signed and sealed this 7th day of December 1971.

(SEAL)
Attest:

EDWARD M. FLETCHER, JR.      ROBERT GOTTSCHALK
Attesting Officer               Acting Commissioner of Patents